T. R. HARRIMAN.
ANIMAL TRAP.
APPLICATION FILED MAY 3, 1916.
1,262,946.
Patented Apr. 16, 1918.
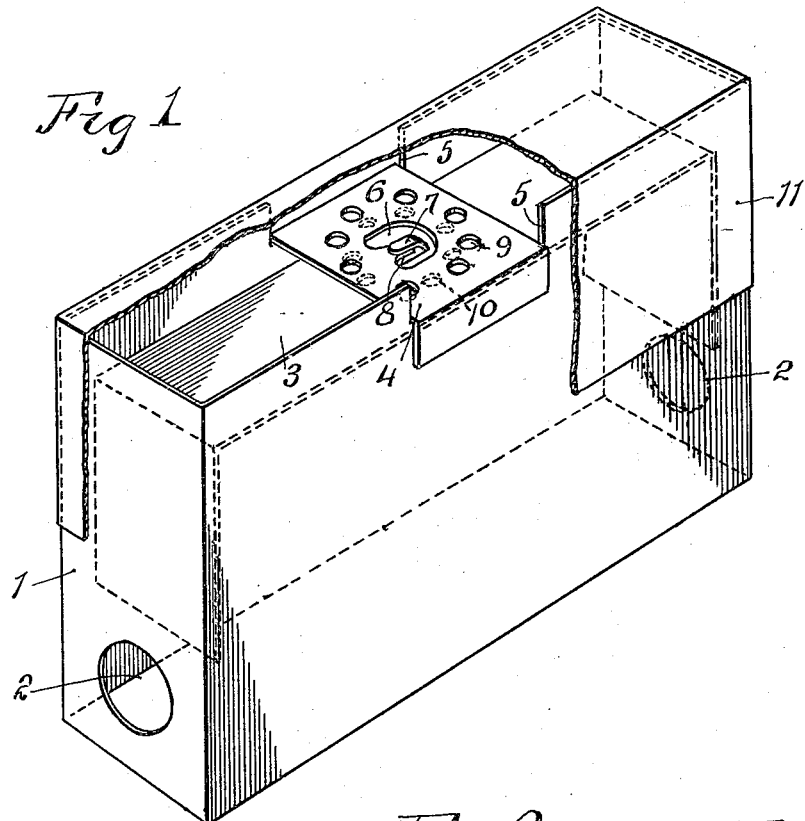
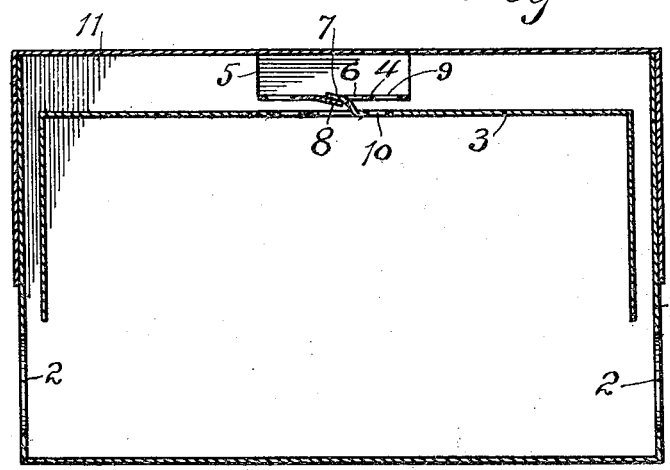
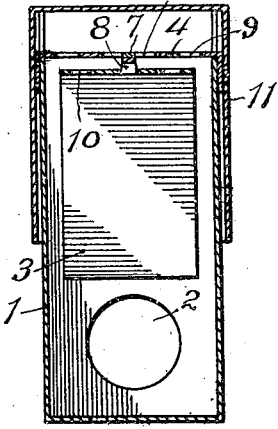
WITNESS
R. E. Hamilton
INVENTOR.
Thomas R. Harriman
BY Warren D. House,
His ATTORNEY.

UNITED STATES PATENT OFFICE.

THOMAS R. HARRIMAN, OF KANSAS CITY, MISSOURI.

ANIMAL-TRAP.

1,262,946.   Specification of Letters Patent.   Patented Apr. 16, 1918.

Application filed May 3, 1916. Serial No. 95,089.

*To all whom it may concern:*

Be it known that I, THOMAS R. HARRIMAN, a citizen of the United States, residing at Kansas City, in the county of Jackson and State of Missouri, have invented a certain new and useful Improvement in Animal-Traps, of which the following is a specification.

My invention relates to improvements in animal traps.

The object of my invention is to provide an animal trap of novel construction which may be cheaply manufactured, which is easy to set, which is reliable in operation, and which provides for the humane and ready disposal of the trapped animals.

The novel features of my invention are hereinafter fully described and claimed.

In the accompanying drawing which illustrates the preferred embodiment of my invention, Figure 1 is a perspective view, partly broken away, of my improved trap, shown in the set position.

Fig. 2 is a central vertical longitudinal sectional view of the same.

Fig. 3 is a central vertical cross section of the same.

Similar reference characters designate similar parts in the different views.

The receptacle for the trapped animals comprises, preferably, a rectangular box 1 provided with an open top, and two oppositely disposed openings 2, in opposite ends thereof, and adjacent to the bottom thereof, which provide entrances for the animals.

Vertically slidable in the receptacle 1 is an inverted U-shaped closure 3, the arms of which are adapted in the lowermost position of the closure to respectively close the openings 2.

Suitable means for releasably supporting the closure 3 in the elevated open position, shown in the drawing, preferably comprises an inverted U-shaped support consisting of a plate 4 which is mounted in notches 5 provided respectively in the opposite sides and upper edges of the box 1. The downwardly extending arms of the plate 4 respectively embrace the outer sides of the box 1.

The plate 4 is provided in its horizontal portion with a U-shaped opening 6, through which is adapted to extend an upwardly and substantially horizontally turned tongue 7, which extends from the central horizontal portion of the closure 3 and which is adapted to rest upon the upper side of a tongue 8 of the plate 4. The closure 3, as shown in Fig. 3, is sufficiently narrow to be capable of being moved laterally in either direction, by an animal in the box 1, to a position in which the tongue 7 will become disengaged from the tongue 8, thereby permitting the unsupported closure 3 to fall by gravity, so that its two arms will respectively close the openings 2 so as to prevent the escape therethrough of the trap handle.

The horizontal portion of the plate 4 is adapted to support a suitable bait, not shown, adapted to attract the animal entering the box. In the course of his exertions in attempting to get the bait, the animal will force the closure 3 laterally to the released position, upon which the closure will automatically move by gravity to the closed position.

For the purpose of permitting the animal in the box to see the bait, and to smell it, the plate 4 and horizontal portion thereunder of the closure 3 may be respectively provided with perforations 9 and 10.

To cover the top of the box 1 and the bait carried on the plate 4, I preferably provide a slidable detachable cover 11, which in the set position of the trap is slid over the upper end of the box, as shown in the drawing.

After the animal has entered the box 1 through one of the openings 2, and has dislodged the closure 3 from its supporting tongue 8, the cover 11 may be removed and then slipped upwardly in an inverted position over the lower end of the box 1. In this position, the sides of the cover 11 will extend above the openings 2. Said sides are of sufficient height such that if the cover is filled with water, the depth of water will be sufficient to drown the animal which has been trapped in the box 1. After the animal has been drowned, the box 1 may be inverted, thus permitting the plate 4, closure 3 and the drowned animal to fall therefrom. The parts may then be reassembled and the trap set in the manner before described.

The trap may be of sufficient dimensions to receive several animals that enter before the closure 3 is released.

I do not limit my invention to the structure shown and described, as various modifications in the form and arrangement of the parts, within the scope of the appended claims, may be made without departing from the spirit of my invention.

What I claim is:—

1. In an animal trap, a receptacle having an opening for the entrance of an animal, a support carried by the receptacle, and a closure for said opening laterally movable in said receptacle and having means for being held by said support in the open position and releasable from said support upon being moved laterally from a predetermined position by an animal in said receptacle, and when released, being automatically movable to the closed position.

2. In an animal trap, a receptacle having an opening for the entrance of an animal, a support carried thereby, and a closure vertically slidable in said receptacle to and from said position closing said opening, and having means for being detachably suspended from said support and releasable therefrom upon being moved laterally from a predetermined position by an animal in said receptacle, and when so supported being in the open position, and when released movable automatically to the closed position.

3. In an animal trap, a receptacle having an opening for the entrance of an animal, a removable cover adapted to contain water and to receive the lower end of the receptacle, and having side walls which extend as high as the top of said opening, a support, and a closure for said opening movable vertically to and from the closed position, and having means for releasably engaging and being held in the open position by said support and releasable therefrom by an animal in said receptacle, and when released being automatically movable to the closed position.

4. In an animal trap, a receptacle having an opening for the entrance of an animal, and having an open top, a removable cover adapted to contain water and to receive either the upper end or the lower end of said receptacle, and having side walls which extend as high as the top of said opening when mounted on the lower end of said receptacle, a support carried by said receptacle, and a closure movable to and from a position closing said opening and having means, when in the open position, for engaging said support so as to be releasably retained in the open position, and releasable from said support by an animal in said receptacle, and when released, being automatically movable to the closed position.

5. In an animal trap, a receptacle having an opening for the entrance of an animal, an inverted U-shaped closure vertically movable to and from a position in which one of its arms will close said opening, means for releasably supporting the closure in an elevated open position, the closure being releasable from said supporting means by an animal, and, when released, being automatically movable to the closed position, and a removable cover adapted to contain water and to receive the lower end of said receptacle, and having said walls which extend as high as the top of said opening.

6. In an animal trap, a receptacle having two oppositely disposed openings for the entrance of an animal and provided with an open top, opposite edges of which are respectively provided with notches, an inverted U-shaped support mounted in said notches and having its arms respectively embracing the adjacent sides of said receptacle, an inverted U-shaped closure vertically movable to and from a position in which its two arms will respectively close said openings, and having means for engaging and being supported by said support, and releasable therefrom by an animal held in said receptacle, and when released, being automatically movable to the closed position.

7. In an animal trap, a receptacle having two openings for the entrance of an animal, a support carried by the upper edges of said receptacle, an inverted U-shaped closure movable to and from a position in which its two arms will respectively close said openings and having means for engaging and being supported by said support and releasable therefrom by an animal held in said receptacle, and, when released, being automatically movable to the closed position, and a removable cover adapted to contain water and to receive the lower end of said receptacle, and having said walls which extend as high as the top of said openings, when mounted on the lower end of said receptacle.

In testimony whereof I have signed my name to this specification.

THOMAS R. HARRIMAN.

Copies of this patent may be obtained for five cents each, by addressing the "Commissioner of Patents, Washington, D. C."